Figure 1:
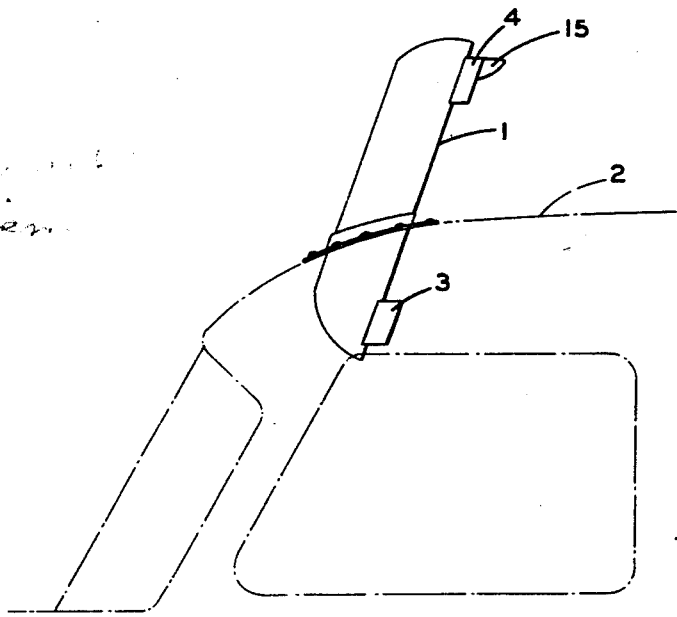

Aug. 7, 1956     F. G. KOVACH     2,757,575

REAR VISION DEVICE

Filed Dec. 24, 1952

INVENTOR.
FRANK G. KOVACH
BY
ATTORNEY

United States Patent Office 2,757,575
Patented Aug. 7, 1956

2,757,575

REAR VISION DEVICE

Frank G. Kovach, Kalamazoo, Mich.

Application December 24, 1952, Serial No. 327,855

1 Claim. (Cl. 88—70)

This inventon relates to a rear vision device for automotive use and particularly to a type thereof having an inverting prism positioned between a pair of mirrors whereby a properly positioned image may be viewed at any ordinarily convenient distance between the observer's eyes and the viewer.

In providing periscopic type rear visions devices for various types of vehicles, particularly automobiles, it has been customary in the past either to provide a pair of mirrors, wherein the image appears in inverted position, or it has been customary to use a system of lenses which requires the observer to place his eye relatively close to an eye piece in order to receive the image provided thereby. Inasmuch as neither of these arrangements is conducive to a usable arrangement, the use of rear view, periscopic, types of devices in automobiles has been severely restricted, practically to the point of non-use, even though many suggestions have been made for their use and their advantages, particularly in heavy traffic or in conditions of snow covered rear windows, has for a long time made their use highly desirable.

Accordingly, a principal object of the invention is to provide a rear-view vision device which can be viewed at any ordinarily convenient distance from the eye piece thereof.

A further object of the invention is to provide a rear-view vision device of a character aforesaid which will present an image in properly erect position.

A further object of the invention is to provide a rear-view vision device as aforesaid which can be conveniently protected from the weather in such a manner that snow and sleet will not gather thereon.

A further object of the invention is to provide a rear-view vision device as aforesaid which will be of simple construction.

A further object of the invention is to provide a device as aforesaid which will be low in its maintenance requirements.

Other objects and purposes of the invention will become apparent to persons acquainted with apparatus of this general sort upon a reading of the following disclosure and an inspection of the accompanying drawings.

In the drawings:

Figure 1 indicates a viewer constructed according to the invention in position on a conventional automobile, the outlines of the automobile top being indicated by broken lines.

Figure 2:
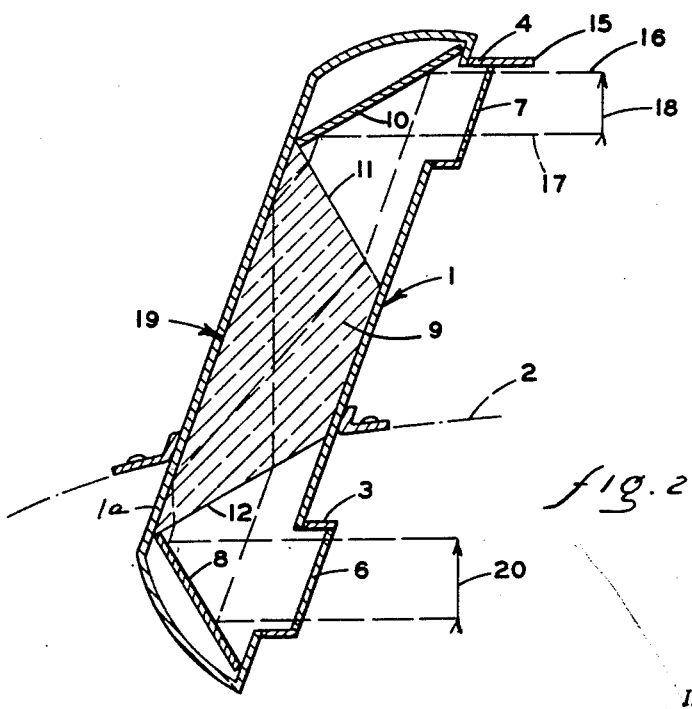

Figure 2 represents said embodiment of the invention shown in vertical central section.

In the following description, for convenience in reference and not for limitation, the following terminology will be used: the terms "upper" and "lower," or derivatives thereof, will be utilized to refer to the apparatus in its normal position of use; the terms, "forward" and "rearward," or derivatives thereof, will be utilized to refer to directions with respect to the front and rearward ends, respectively, of the automobile with which the device is used when positioned in its normal position of use as illustrated; and the terms "longitudinal" and "transverse," or derivatives thereof, will refer to directions along the length or across the width, respectively, of the automobile with which the device is being used. Further, the terminology "eye piece" and "objective" will be utilized to designate certain parts of the apparatus. These terms are selected to indicate position only and no implication of function should be made with respect to the normal meaning of these terms when used with lens systems.

In general, my invention consists in providing a pair of mirrors positioned at approximately 45 degrees with respect to horizontal and at 90 degrees with respect to each other, together with an inverting prism positioned between said mirrors in order that the image appearing to the observer will be in a properly erect position.

In more detail, I provide a substantially vertical mounting housing 1, which may be of either polygonal or circular cross-section, which extends through the automobile top 2 and is sealed thereto in any convenient manner. In the particular embodiment here shown, said mounting tube is raked rearwardly slightly to improve its appearance but its function is not changed. Hence all angular relationships of the hereinafter mentioned mirrors and associated parts will be stated as though the mounting housing 1 were placed in a true vertical position, it being understood that the actual angle in any given case will be modified according to known optical principles to compensate for whatever angle of rake is provided in a given case. An eye piece tube 3 extends horizontally and rearwardly with respect to the automobile from the lower end of the mounting housing 1 and an upper tube 4 extends horizontally and rearwardly with respect to the automobile from the upper end of said mounting housing 1. Each of said lower and upper tubes are open at their rearward ends and are tightly sealed at their forward ends to the connected ends of said mounting housing.

It is desirable, although not essential to the basic operation of the device, that said sealing together of said upper and lower tubes and said mounting housing should be carried out so that there will be no entry of moisture or dust into the interior of the device, and, further, that there be also provided glass closures 6 and 7 at the rearward ends of the lower and upper tubes, respectively, and these, too, are tightly sealed to their respectively attached tubes in order to prevent the entry of moisture or dust.

An eye piece mirror 8 is positioned transversely of the automobile at a 45 degree angle with respect to the horizontal (plus one-half the angle of rearward rake, if any) in the lower end of the mounting housing 1. An objective mirror 10 is similarly positioned transversely with respect to the automobile at the upper end of said mounting housing 1 and at a 45 degree angle with respect to the horizontal (less one-half the angle of rearward rake, if any) and at a 90 degree angle with respect to said eye piece mirror. An inverting prism 9 is positioned within said mounting housing 1 intermediate said two mirrors and said prism is of such dimensions in all horizontal directions as substantially to fill the entirety of said mounting housing 1. Said prism has its upper face 11 disposed at a 45 degree angle to the horizontal and parallel with the plane defined by the eye piece mirror 8 and it likewise has its lower face 12 disposed at 45 degrees to the horizontal and parallel with the plane defined by the objective mirror 10 with said faces equal in longitudinal dimension to the corresponding dimension of said mirrors and equal to each other. Said faces 11 and 12 are spaced apart a distance such that their most closely adjacent edges are spaced apart a distance substantially equal to the longitudinal length of said mirrors times the cosine of 45 degrees.

The mounting housing 1 preferably has its sides vertically arranged and parallel with each other but certain conditions could be conceived in which other relationships, as tapering, might be desirable.

The rearwardly extending upper tube 4 is preferably provided with a shield 15 in order to protect the glass plate 7 from snow or sleet.

The operation of the device is indicated by the broken lines 16 and 17 in Figure 2. Utilizing the arrow 18 to indicate an object being viewed, the line 16 will designate the path of light emanating from the tip of the arrow and the line 17 will designate the path of light from the tail of the arrow. The light ray from the head of the arrow first strikes the upper edge of the mirror 10, travels thence to the upper surface 11 of the prism, is there refracted and travels to the forward surface 19 of said prism. At said forward surface said light ray is reflected to the lower surface 12 of said prism and strikes same near the forward edge thereof. It is again refracted and now travels along the forward edge 1a of the mounting housing 1. It strikes the upper edge of the eye piece mirror 8 and thence travels rearwardly to form an image of the arrow head as indicated at 20.

The light from the tail of the arrow travels through a corresponding path, as indicated by the line 17, and appears in position to form an image of the tail of the arrow indicated at 20.

Inasmuch as the rays of the light emanating from the eye piece mirror 8 are travelling parallel with respect to each other, the image formed thereby can be viewed at any convenient distance from said eye piece mirror as suits the convenience of the operator of the vehicle.

While a specific embodiment of the invention has been utilized for illustrative purposes, it will be understood that a variety of modifications will be apparent to persons acquainted with apparatus of this general type and that such modifications will be included within the scope of the hereinafter appended claim excepting as said claim may by its own terms expressly require otherwise.

I claim:

In a rear vision device for positioning in the roof of an automotive vehicle, the combination comprising: a substantially vertically positioned, hollow, mounting housing open at its upper and lower ends; a lower opening at the lower end of said mounting housing facing rearwardly on a substantially horizontal lower axis and an upper opening at the upper end of said mounting housing facing rearwardly on a substantially horizontal upper axis; an eye piece mirror located at the lower end of said mounting housing, facing upwardly and rearwardly, and positioned at equal angles to said lower axis and the central longitudinal axis of said mounting housing; an objective mirror located at the upper end of said mounting housing facing downwardly and rearwardly and positioned at equal angles with respect to said upper axis and to said central longitudinal axis of said mounting housing; a prism positioned within said mounting housing intermediate said respective mirrors and in contact with each thereof and having an upper surface defining a plane parallel with the plane defined by said eye piece mirror and having a lower surface defining a plane parallel with the plane defined by said objective mirror and the distance between the most closely adjacent edges of said upper and said lower surfaces being substantially equal to the dimension of said prism along a line perpendicular to said central axis and lying substantially in the plane of said upper and lower axes.

References Cited in the file of this patent

UNITED STATES PATENTS

| | | |
|---|---|---|
| 2,099,105 | Dippel | Nov. 16, 1937 |
| 2,375,887 | Barden | May 15, 1945 |
| 2,512,792 | Delaney | June 27, 1950 |
| 2,546,111 | Rattray | Mar. 20, 1951 |
| 2,551,243 | Campbell | May 1, 1951 |